(12) United States Patent
Kownacki et al.

(10) Patent No.: US 7,478,263 B1
(45) Date of Patent: Jan. 13, 2009

(54) SYSTEM AND METHOD FOR ESTABLISHING BI-DIRECTIONAL FAILOVER IN A TWO NODE CLUSTER

(75) Inventors: Ronald William Kownacki, Pittsburgh, PA (US); Jason S. Bertschi, Pittsburgh, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 525 days.

(21) Appl. No.: 10/858,418

(22) Filed: Jun. 1, 2004

(51) Int. Cl.
*G06F 11/00* (2006.01)
(52) U.S. Cl. ............................... 714/4; 714/10; 714/11; 714/13; 714/43
(58) Field of Classification Search .................. 714/4, 714/11, 13, 43, 10, 16, 20, 56; 709/220, 709/221
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ehrot et al. | |
| 5,951,695 A | 9/1999 | Kolovson | |
| 6,119,244 A | 9/2000 | Schoenthal et al. | |
| 6,292,905 B1 | 9/2001 | Wallach et al. | |
| 6,625,749 B1 | 9/2003 | Quach | |
| 6,728,897 B1 | 4/2004 | Cramer et al. | |
| 6,775,702 B2 | 8/2004 | Oeda et al. | |
| 6,789,213 B2* | 9/2004 | Kumar et al. .................. 714/13 |
| 7,120,821 B1* | 10/2006 | Skinner et al. .................. 714/4 |
| 7,302,607 B2* | 11/2007 | Gunda et al. .................. 714/10 |
| 2003/0023680 A1* | 1/2003 | Shirriff .................. 709/204 |
| 2003/0074596 A1* | 4/2003 | Mashayekhi et al. ........... 714/4 |

OTHER PUBLICATIONS

Anupam Bhide, Elmootazbellah N. Elnozahy, Stephen P. Morgan, "A Highly Available Network File Server," Proceedings of the Winter 1991 USENIX Conference, Jan. 21-25, 1991, pp. 199-205.

* cited by examiner

*Primary Examiner*—Robert Beausoliel
*Assistant Examiner*—Joseph D Manoskey
(74) *Attorney, Agent, or Firm*—Cesari and McKenna LLP

(57) ABSTRACT

A system and method for permitting bi-directional failover in two node clusters utilizing quorum-based data replication. In response to detecting an error in its partner the surviving node establishes itself as the primary of the cluster and sets a first persistent state in its local unit. A temporary epsilon value for quorum voting purposes is then assigned to the surviving node, which causes it to be in quorum. A second persistent state is stored in the local unit and the surviving node comes online as a result of being in quorum.

31 Claims, 12 Drawing Sheets

SYSTEM AND METHOD FOR ESTABLISHING BI-DIRECTIONAL FAILOVER IN A TWO NODE CLUSTER

FIELD OF THE INVENTION

The present invention relates to clustered systems and, in particular to establishing bi-directional failover in a two node clustered system.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a hybrid write-anywhere file system that is configured to operate on a filer is the SpinFS file system available from Network Appliance, Inc. of Sunnyvale, Calif. The exemplary SpinFS file system utilizes a write anywhere technique for user and directory data but writes metadata using a write in place technique. The SpinFS file system is implemented within a storage operating system of the filer as part of the overall protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity partitions in a single disk) arranged according to a RAID 4, or equivalent high-reliability, implementation.

It is advantageous for the services and data provided by a filer or storage system to be available for access to the greatest degree possible. Accordingly, some storage system environments provide a plurality of storage systems (i.e. nodes) in a cluster where data access request processing may be distributed among the various nodes of the cluster. Executing on each node is a collection of management processes that provides management of configuration information (management data) "services" for the nodes. Each of these processes has an interface to a replicated database (RDB) that provides a persistent object store for the management data. In addition, the RDB replicates and synchronizes changes (updates) made to the management data by the management processes across all nodes to thereby provide services based on replicated data throughout the cluster. This data replication is the key to providing management from any node in the cluster (a single system image). To be clear, these are not "replicated services" in the normal use of the term (independent services without data sharing); rather, these are independent services which utilize replicated data as a means to enhance availability and autonomous capabilities within a cluster-wide single system image.

In cluster environments the concept of a quorum exists to ensure the correctness of the data replication algorithm, even in the event of a failure of one or more nodes of the cluster. By "quorum" it is meant generally a majority of the "healthy" (i.e. operational) nodes of the cluster. That is, a cluster is in quorum when a majority of the nodes are operational and have connectivity to other nodes; in addition, all nodes in the quorum have read/write (RW) access to the replicated management data (i.e. can participate in incremental updates to that data). By requiring that each update be synchronously propagated to a majority of the nodes (a quorum), the replication algorithm is guaranteed to retain all updates despite failures.

Broadly stated, a quorum of nodes is established by (1) ensuring connectivity among a majority of operational nodes; (2) synchronizing a baseline of management data among the nodes and (3) allowing a majority of operational nodes to participate in incremental changes to that baseline data. In clusters containing an even number of nodes, e.g., four nodes, one of the nodes is typically assigned an epsilon value to its quorum weight, thereby enabling quorum formation without a strict majority, e.g., (2+e)/4 is sufficient. In a two-node cluster, (1+e)/2 is sufficient (the single epsilon node). The epsilon assignment is an aspect of cluster configuration; all the nodes must agree on the epsilon assignment.

The value of requiring quorum for update in a cluster lies in the correctness and completeness of replication. This is illustrated by the "partition" problem. A partition occurs when connectivity is lost to one set of nodes as a result of a power failure or other failures to the cluster. The cluster may continue to operate with the remaining set of nodes; all nodes can read their management data, and if that set is sufficient to meet quorum requirements, all the member nodes can update the data. If connectivity is then lost within this set, and is subsequently restored to the other set of nodes, it is possible that the second set will have access only to the management data present before the first connectivity failure. In this case, it will not be able to form quorum, and will not be able to perform updates. If there were a sufficient number of nodes to establish quorum, then at least one of them would have seen the latest updates (as a participant in the prior quorum), and all the nodes in the second set would have the update capability. The quorum requirement guarantees that updates can only be made when the latest data is available.

A noted disadvantage of such quorum-based data replication systems is the inability to meet quorum requirements, thereby preventing any update (write) operations from occurring. This can occur as a result of communication failures, problems with health of individual node(s), or a combination of these problems. In clusters that utilize these services, the inability to form quorum may prevent an administrator from modifying the management data so as to reconfigure the cluster into an operational state.

This is particularly problematic in the case of a two node cluster, wherein the failure of either node forces the cluster out of quorum (1/2), as a single node is not a majority of the number of nodes in the cluster. A solution that enables the two node cluster to achieve a measure of failover is the use of the epsilon value. Here, one of the nodes in the cluster is assigned the epsilon value in addition to its own voting value. If the non-epsilon node fails, the surviving node may continue to operate in quorum as it has a (1+e)/2 quorum voting value (weight). However, a noted disadvantage of the use of an epsilon value is that failover may only occur in one direction, i.e. to the node with epsilon. That is, if the node with epsilon fails, the cluster will not failover to the node without epsilon as it would not be in quorum (1/2). Thus, the use of an epsilon factor in assigning quorum voting weights only partially alleviates the problem of two node clusters; i.e., only a unidirectional failover is possible when using an epsilon-assigned quorum voting system.

SUMMARY OF THE INVENTION

The present invention overcomes the disadvantages of the prior art by providing a system and method for bi-directional failover among nodes of a two node cluster using quorum-based data replication. An operator selects HA-configuration for the cluster via a management function. In HA-configuration, neither node is configured with epsilon, so the normal quorum requirements are 2/2 (both nodes required). In response to a failure to one of the nodes, or a failure in communication between the nodes, the cluster exits the conventional (2/2) quorum state and enters a high availability "active" state wherein only a single "HA-active" node is designated as a full read/write (RW) replica of the cluster, thereby dispensing with typical quorum requirements. As a full RW replica, the HA-active node can modify (update) configuration information (i.e., management data) normally maintained by the cluster's quorum-based data replication service. Once the failure is corrected, the data for the two nodes is synchronized, and the cluster will revert back to the conventional (2/2) quorum state.

In the event of a failure to a node, a procedure is executed to transition the cluster into the HA active state, wherein the surviving node is designated as the HA-active node. In the event of a communications failure between the nodes of the replicated data cluster, only one node can be designated HA-active to ensure that only one copy of the replicated service management data can be modified. In general, a surviving node cannot distinguish between communications failure and failure of the remote node, so both these cases must be handled identically. An alternative communications technique is provided to select a primary node from among the nodes.

In the illustrative embodiment, the alternate communication technique comprises a voting mechanism involving storage pools own by a disk element (D-blade) of each node. Only one D-blade can be the primary active owner of a storage pool at a time, wherein ownership denotes the ability to write data to the storage pool. The alternate communication technique extends the storage pool voting mechanism to include a replicated database high availability storage pool (RDBHASP) data structure that is resident in the D-blade's storage pool and adapted to store information (status, state and configuration settings) associated with the data replication service. An example of information stored in the RDBHASP structure is the indication whether the D-blade's node is the HA-active node for the data replication service; this "activity lock" records whether one of the two nodes is currently designated as HA-active (under failover), and if so, which one.

Specifically, each node queries its D-blade to determine if it is the primary—the owner of the storage pool. If the node is the sole surviving node in the cluster, it will naturally be the primary; in case of communications failure, at most one of the nodes will be primary for the storage pool. In all cases, the D-blade guarantees that at most one node can be primary. This is crucial, as only the primary has the right to attempt to acquire the HA-activity lock.

If the node is primary, and if the other node does not hold the HA-activity lock at the D-blade, then the node acquires the HA-activity lock by marking an entry in the RDBHASP data structure designating itself as the HA-active node in the cluster; this involves recording its node (site) ID in RDB-HASP. It then persistently stores the HA_PREACTIVE state in its local unit, in effect caching a local indication of the locked ability to be active (i.e., the HA-activity lock). By caching this persistent state information locally, the node may continue in HA active mode even if it or the D-blade suffers an error condition and/or is reinitialized, or if the primary moves from one D-blade to another. Note that this process is repeated independently for each of the data replication rings.

Once it has transitioned to the HA_PREACTIVE state, the surviving node disables the quorum voting mechanism, and waits an appropriate amount of time to ensure that quorum voting has ceased. The surviving node then assigns a temporary epsilon value to itself, which causes the node to enter the quorum via the (1+e)/2 requirement. The temporary epsilon is an implementation trick that allows easy reuse of all the standard configuration-epsilon based quorum design and code. Once the temporary epsilon value has been set, the node transitions to a HA_ACTIVE state and then comes online as the full RW replica for the replicated service. The present invention provides a bi-directional failure path by obtaining an HA-activity lock and assigning a temporary epsilon after failure of communications or one of the two nodes in the two node cluster. Thus, if either node in the cluster fails, the other node may assume the full RW replica status as it is in quorum.

Once the failure condition has passed, the HA-active master recognizes the presence of the other node, it drops temporary epsilon, and reestablishes normal voting. It then brings the node into synchronization via the normal distributed recovery protocol, clears the locally cached activity lock, and clears the activity lock in RDBHASP. The cluster is then fully operational with both nodes and may again fail in either direction. Storage of the HA_PREACTIVE and HA_ACTIVE states in the local unit along with setting the appropriate HA-activity lock in the RDBHASP data structure prevents the transition from one failed state, e.g., node 1 active and node 2 failed, directly to another failed state, e.g., node 1 failed and node 2 active. This ensures that before passing into the other failed state, the cluster will pass through a state where both nodes are active and have been synchronized during distributed recovery. This prevents data inconsistency and/or loss of data arising from divergent update paths.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
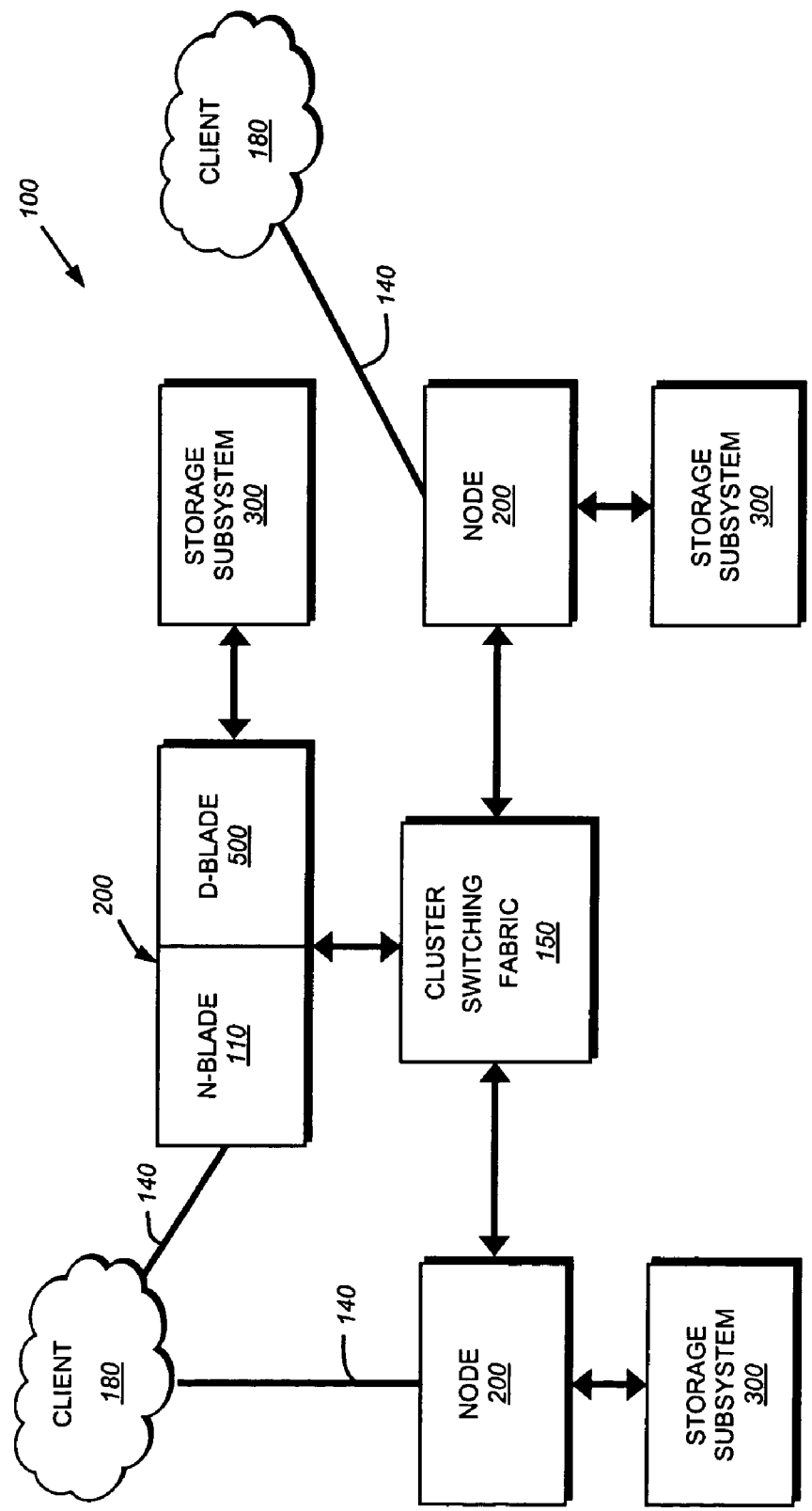
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each SpinFS node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled Method and System for Responding to File System Requests, by M. Kazar et al. published Aug. 22, 2002.

B. Storage Systems

Figure 2:
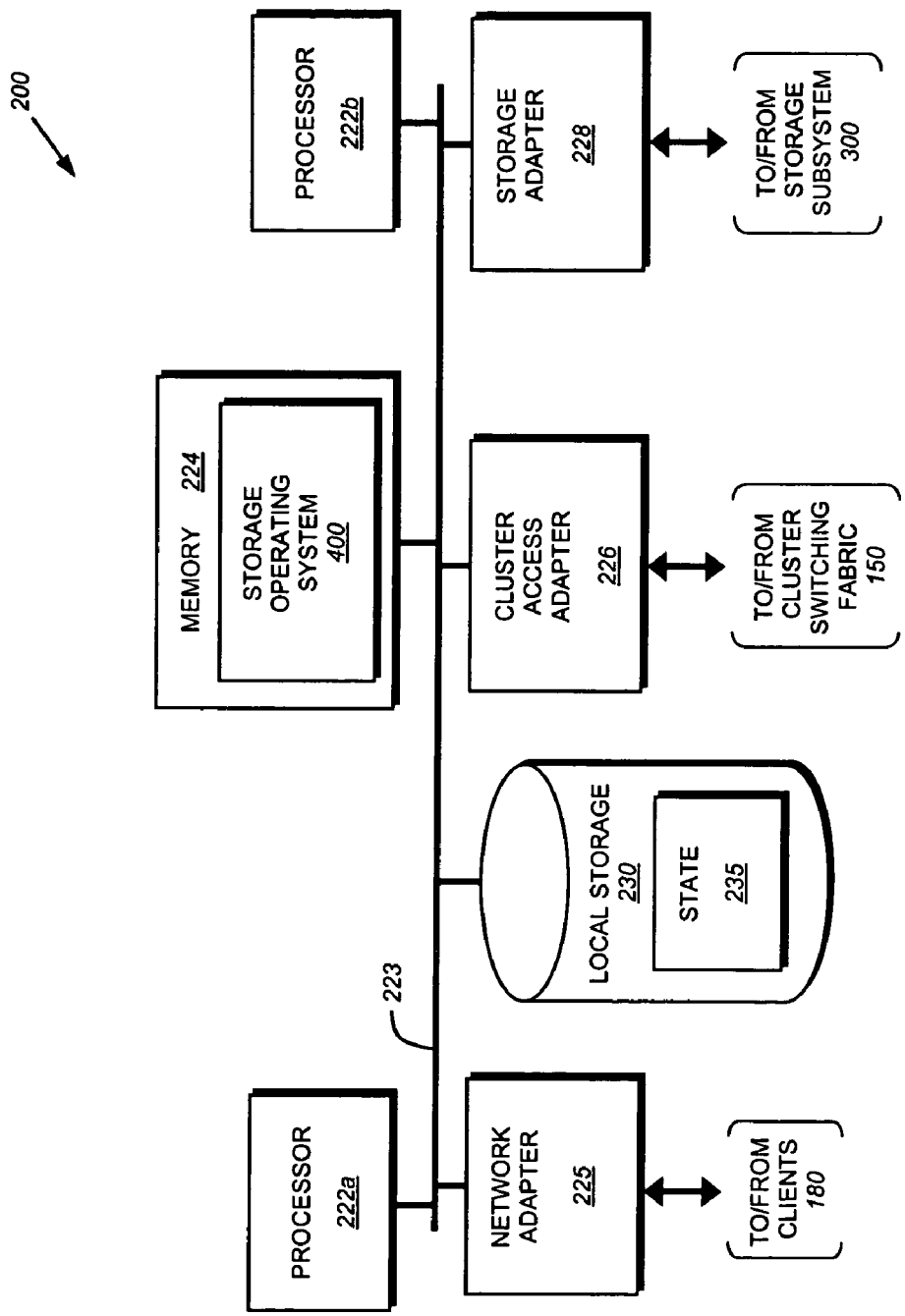
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, local storage 230 and a storage adapter 228 interconnected by a system bus 223. The local storage 230 is utilized by the node to store local configuration information (i.e. management data), including its local copy of a replicated database (RDB) 850 (see FIG. 8) and, to that end, functions as a local unit for the node. The local unit may comprise any form of persistent storage including, e.g., disk drives or non-volatile random access memory (NVRAM). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500.

In the illustrative embodiment, the memory 224 comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive technique described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
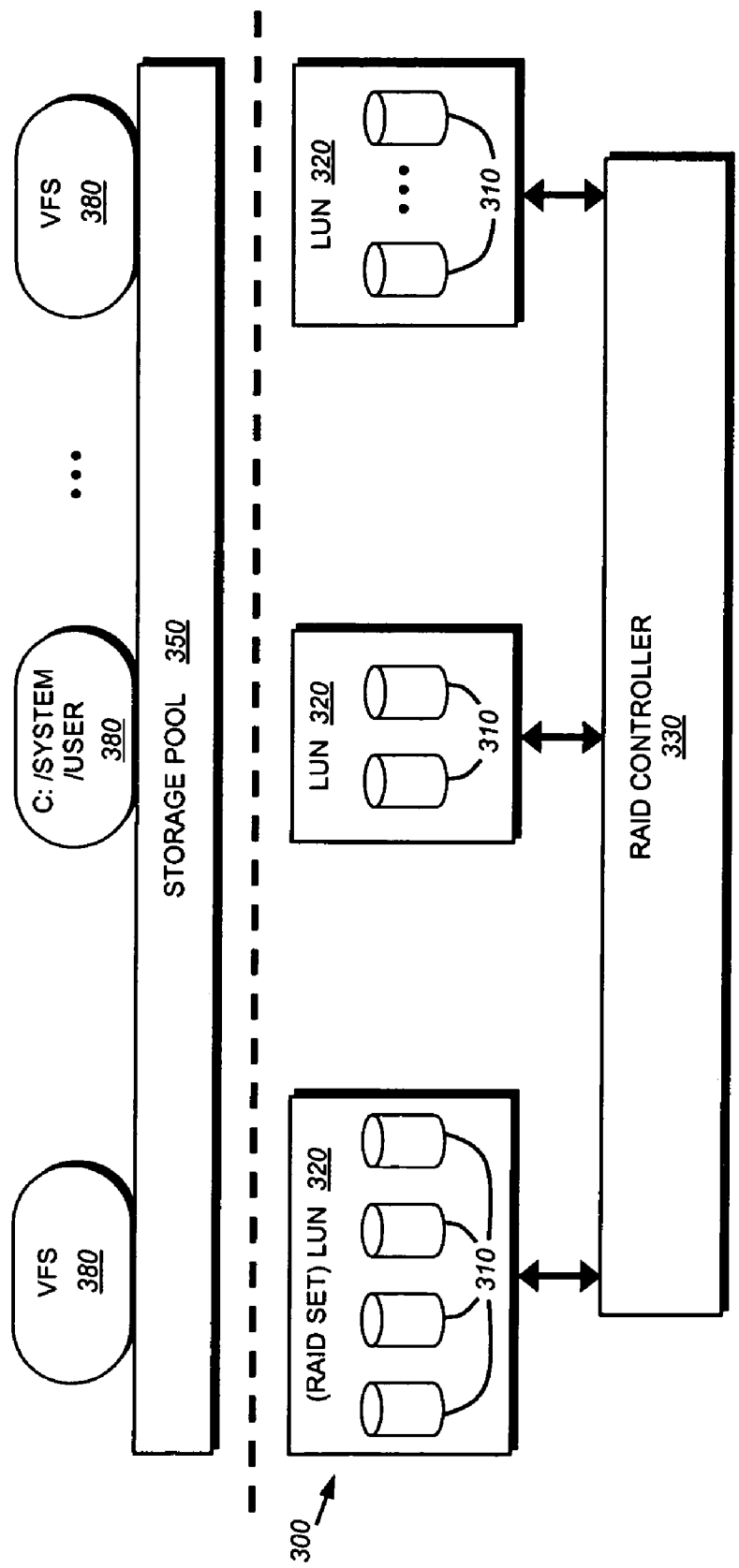
FIG. 3 is a schematic block diagram illustrating a storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 120, which writes and reads blocks to and from the LUN 320. One or more LUNs are illustratively organized as a storage pool 350, wherein each storage pool 350 is "owned" by a D-blade 120 in the cluster 100. Each storage pool 350 is further organized as a plurality of virtual file systems (VFSs 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. A group of VFSs may be composed into a larger namespace. For example, a root directory (c:) may be contained within a root VFS ("/"), which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFSs that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
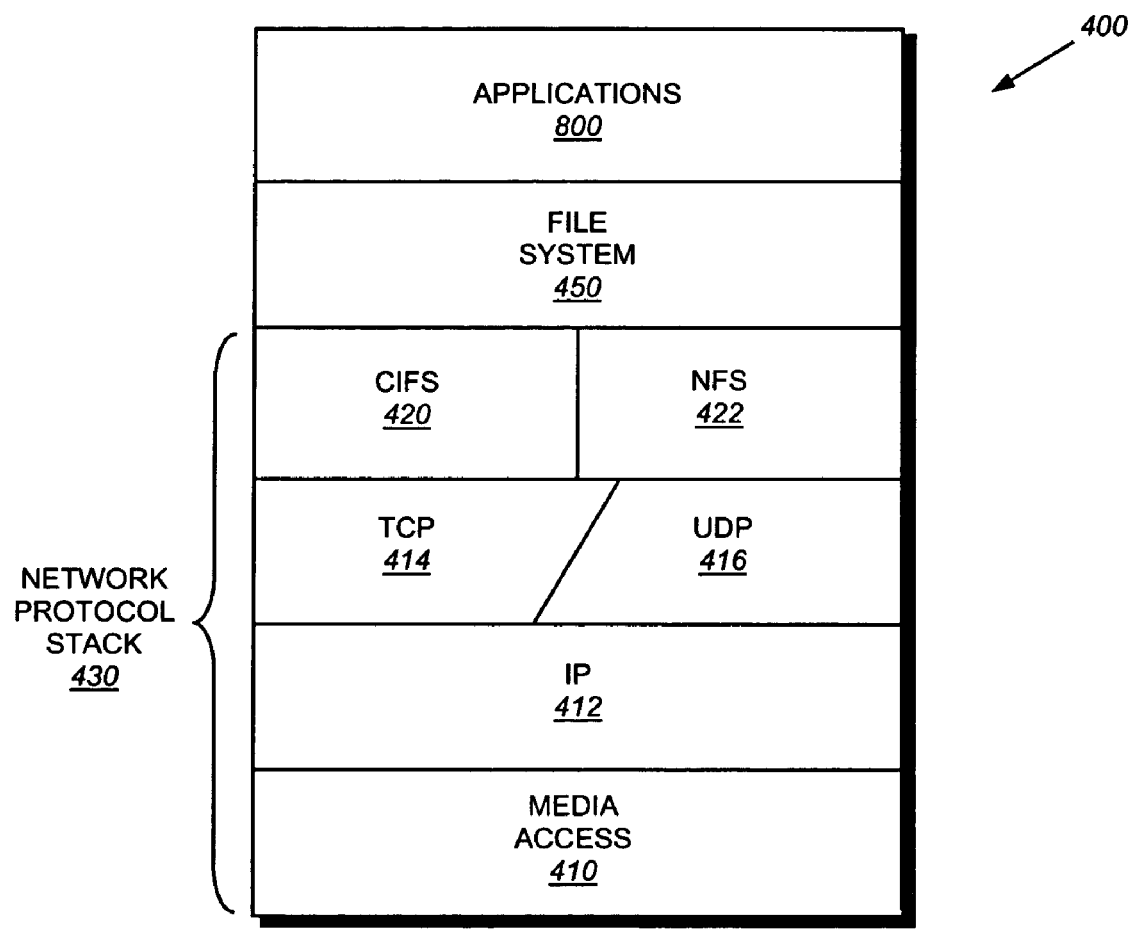
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 220 and the NFS protocol 222. As described further herein, a plurality of management processes executes as user mode applications 800 to provide management of configuration information (management data) services for the nodes.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 140. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

Figure 5:
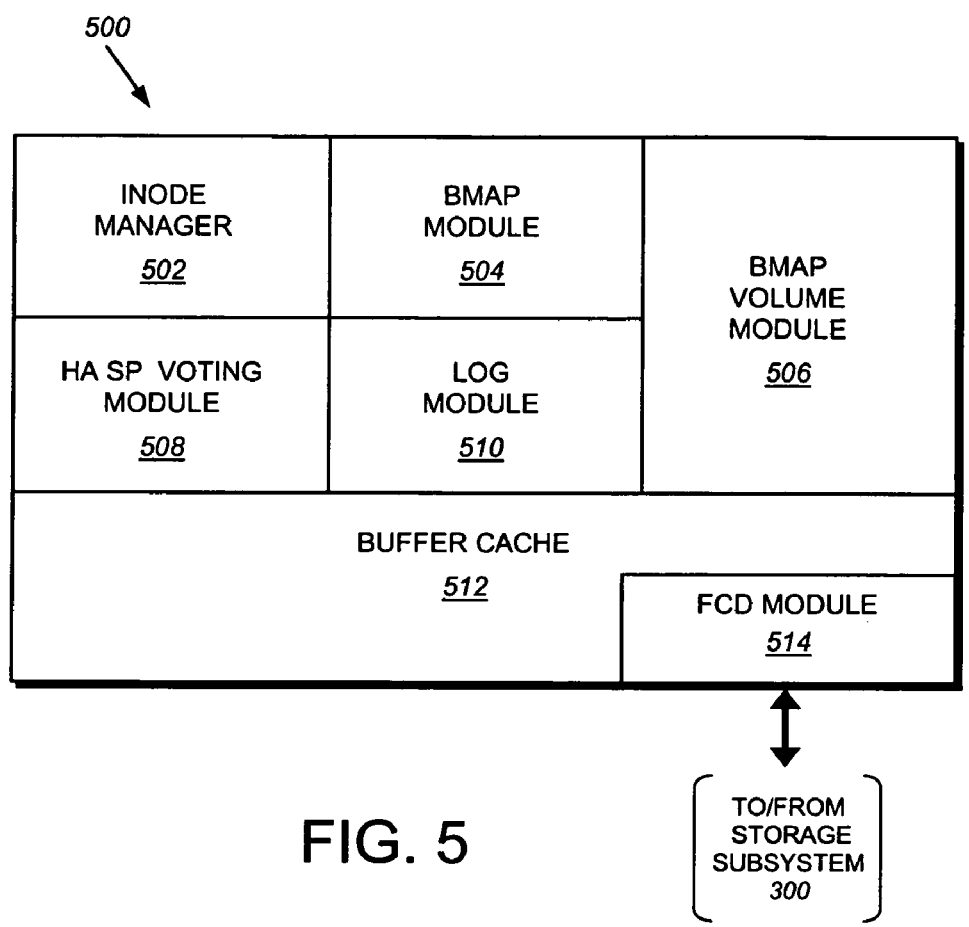
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The D-blade also includes a high availability storage pool (HA SP) voting module 508, a log module 510, a buffer cache 512 and a fiber channel device driver (FCD) module 514.

Specifically, the inode manager 502 is the processing module that implements the SpinFS file system 450. The Bmap module 504 is responsible for all block allocation functions associated with a write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS.

Figure 6:
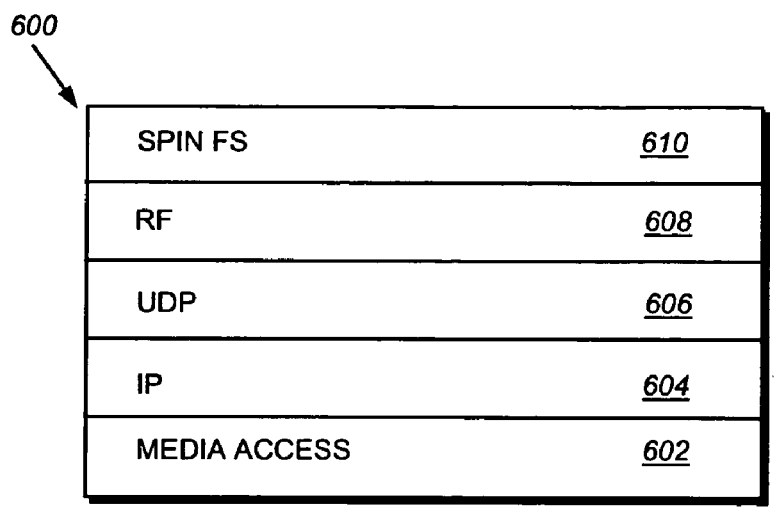
FIG. 6 is a schematic block diagram illustrating the format of a SpinFS request that may be advantageously used with the present invention.

As noted, the NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As also noted, the SpinFS protocol 610 is a file system protocol that provides operations, related to those operations contained within incoming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
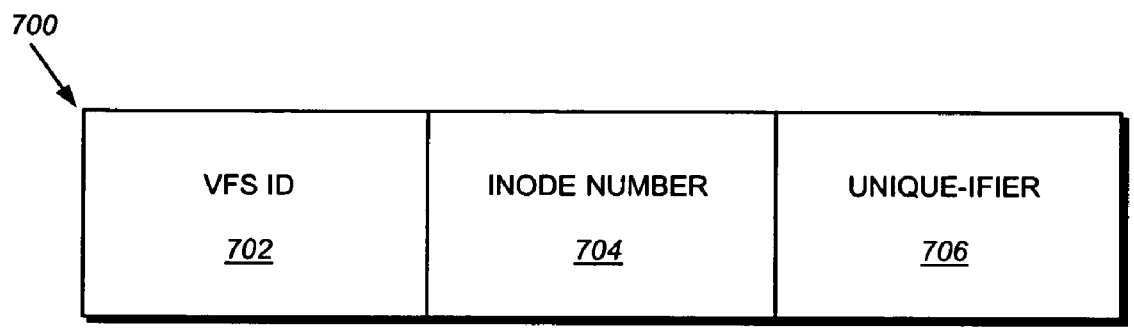
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
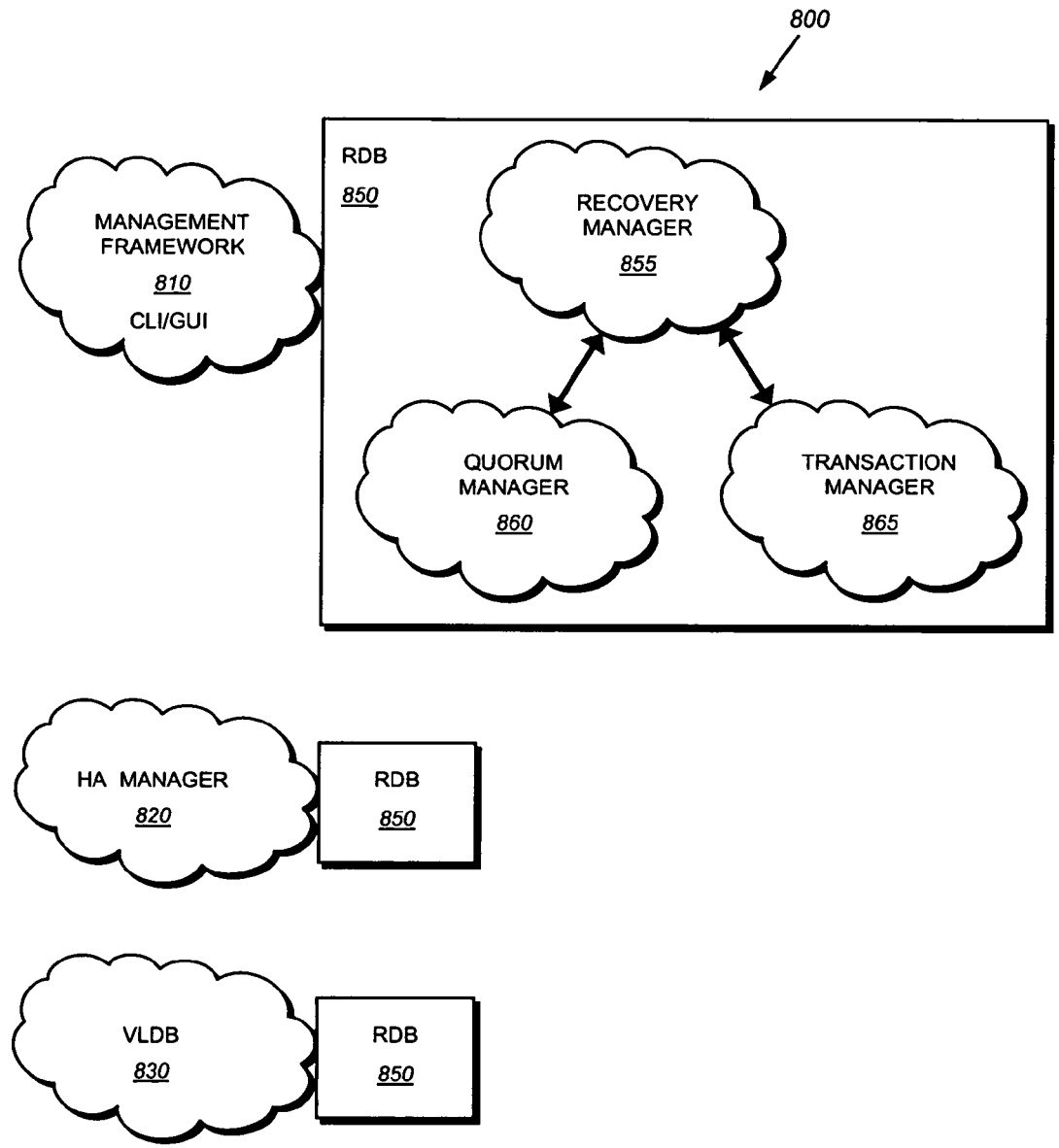
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400. The management processes provide management data services to the nodes of the cluster and include a management framework process 810, a high availability manager (HA Mgr) process 820, a VFS location database (VLDB) process 830, each utilizing a data replication service (RDB) 850 linked in as a library. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) the RDB 850. The RDB comprises a library that provides a persistent object store (storing of objects) pertaining to configuration information and status throughout the cluster. Notably, the RDB 850 is a shared management data services database that is identical (has a replicated image) on all nodes 200 to thereby provide a replicated services cluster 100. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

The RDB, in turn, contains a number of components, inter alia, a recovery manager 855, a quorum manager 860 and a transaction manager 865. The recovery manager 855 oversees a distributed recovery mechanism of the RDB 850, and is responsible for synchronizing databases as nodes come into quorum. It interfaces with the quorum manager 855 and transaction manager 865. The quorum manager 860 manages quorum voting and heartbeat signals to ensure that the cluster is in quorum. Should the cluster and/or individual nodes fall in or out of quorum, the quorum manager 860 alerts the recover manager 855. The transaction manager 865 processes all RDB transactions, propagating them to remote in-quorum nodes, and ensuring that each is performed atomically (all or none).

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

D. File System

Figure 9:
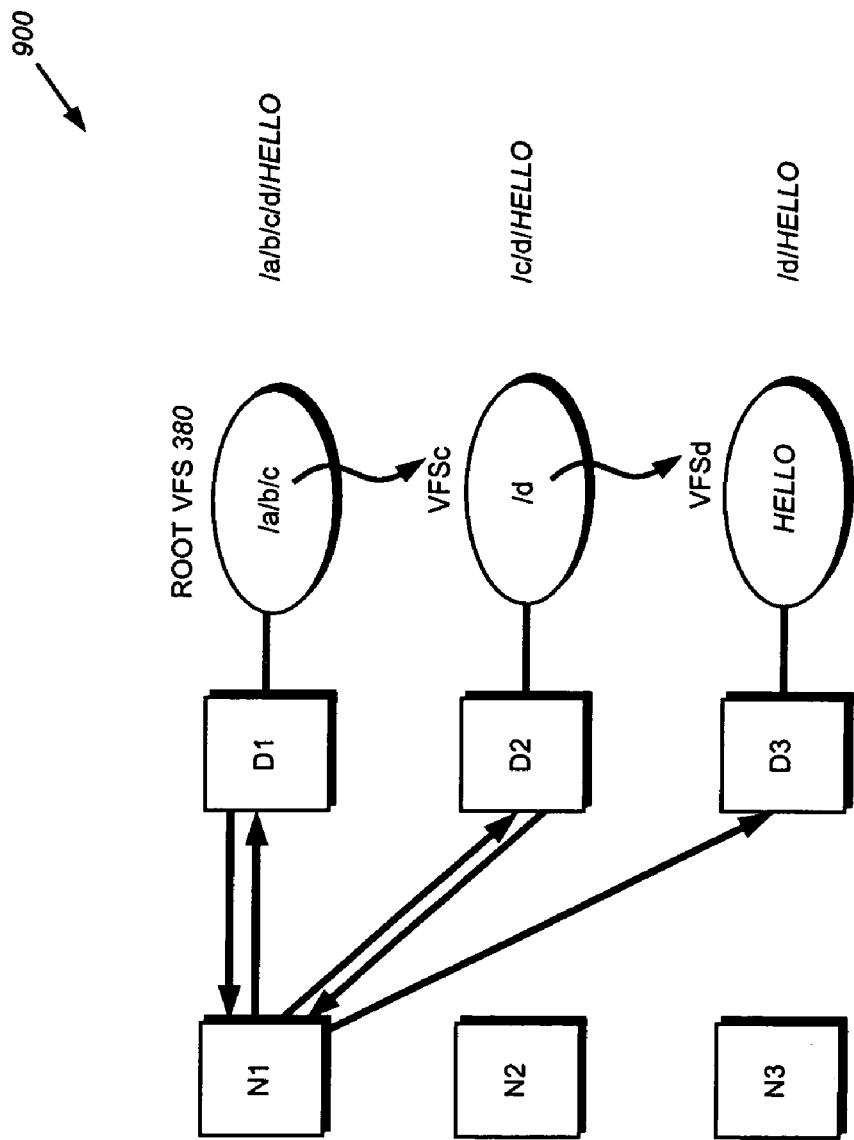
FIG. 9 is a schematic block diagram illustrating a distributed file system arrangement for processing a file access request in accordance with the present invention.

FIG. 9 is a schematic block diagram illustrating a distributed file system (SpinFS) arrangement 900 for processing a file access request at nodes 200 of the cluster 100. Assume a CIFS request packet specifying an operation directed to a file having a specified pathname is received at an N-blade 110 of a node 200. Specifically, the CIFS operation attempts to open a file having a pathname /a/b/c/d/Hello. The CIFS server 420 on the N-blade 110 performs a series of lookup calls on the various components of the pathname. Broadly stated, every cluster 100 has a root VFS 380 represented by the first "/" in the pathname. The N-blade 110 performs a lookup operation into the lookup table to determine the D-blade "owner" of the root VFS and, if that information is not present in the lookup table, forwards a RPC request to the VLDB 830 in order to obtain that location information. Upon identifying the D1 D-blade owner of the root VFS, the N-blade 110 forwards the request to D1, which then parses the various components of the pathname.

Assume that only a/b/ (e.g., directories) of the pathname are present within the root VFS. According to the SpinFS protocol, the D-blade 500 parses the pathname up to a/b/, and then returns (to the N-blade) the D-blade ID (e.g., D2) of the subsequent (next) D-blade that owns the next portion (e.g., c/) of the pathname. Assume that D3 is the D-blade that owns the subsequent portion of the pathname (d/Hello). Assume further that c and d are mount point objects used to vector off to the VFS that owns file Hello. Thus, the root VFS has directories a/b/ and mount point c that points to VFS c which has (in its top level) mount point d that points to VFS d that contains file Hello. Note that each mount point may signal the need to consult the VLDB 830 to determine which D-blade owns the VFS and, thus, to which D-blade the request should be routed.

The N-blade (N1) that receives the request initially forwards it to D-blade D1, which send a response back to N1 indicating how much of the pathname it was able to parse. In addition, D1 sends the ID of D-blade D2 which can parse the next portion of the pathname. N-blade N1 then sends to D-blade D2 the pathname c/d/Hello and D2 returns to N1 an indication that it can parse up to c/, along with the VFS containing the next portion of the path. The N-blade accesses the VLDB to locate the next D-blade (D3). N1 then sends the remaining portion of the pathname to D3, which then accesses the file Hello in VFS d. Note that the distributed file system arrangement 800 is performed in various parts of the cluster architecture including the N-blade 110, the D-blade 500, the VLDB 830 and the management framework 810.

The distributed SpinFS architecture includes two separate and independent voting mechanisms. The first voting mechanism involves storage pools 350 which are typically owned by one D-blade 500 but may be owned by more than one D-blade, although not all at the same time. For this latter case, there is the notion of an active or current owner of the storage pool, along with a plurality of standby or secondary owners of the storage pool. In addition, there may be passive secondary owners that are not "hot" standby owners, but rather cold standby owners of the storage pool. These various categories of owners are provided for purposes of failover situations to enable high availability of the cluster and its storage resources. This aspect of voting is performed by the HA SP voting module 508 within the D-blade 500. Only one D-blade can be the primary active owner of a storage pool at a time, wherein ownership denotes the ability to write data to the storage pool. In essence, this voting mechanism provides a locking aspect/protocol for a shared storage resource in the cluster. This mechanism is further described in U.S. Patent Application Publication No. US 2003/0041287 titled Method and System for Safely Arbitrating Disk Drive Ownership, by M. Kazar published Feb. 27, 2003.

The second voting mechanism is a cluster-wide node membership quorum voting mechanism that allows the RDB 850 of each node 200 to vote for a master or coordinating RDB node. This RDB voting protocol is different than the storage pool voting protocol. Whereas the storage pool voting mechanism involves writing to blocks on disks, the quorum voting mechanism involves message exchanges among RDB members of a cluster over the cluster switching fabric 150.

Figure 10:
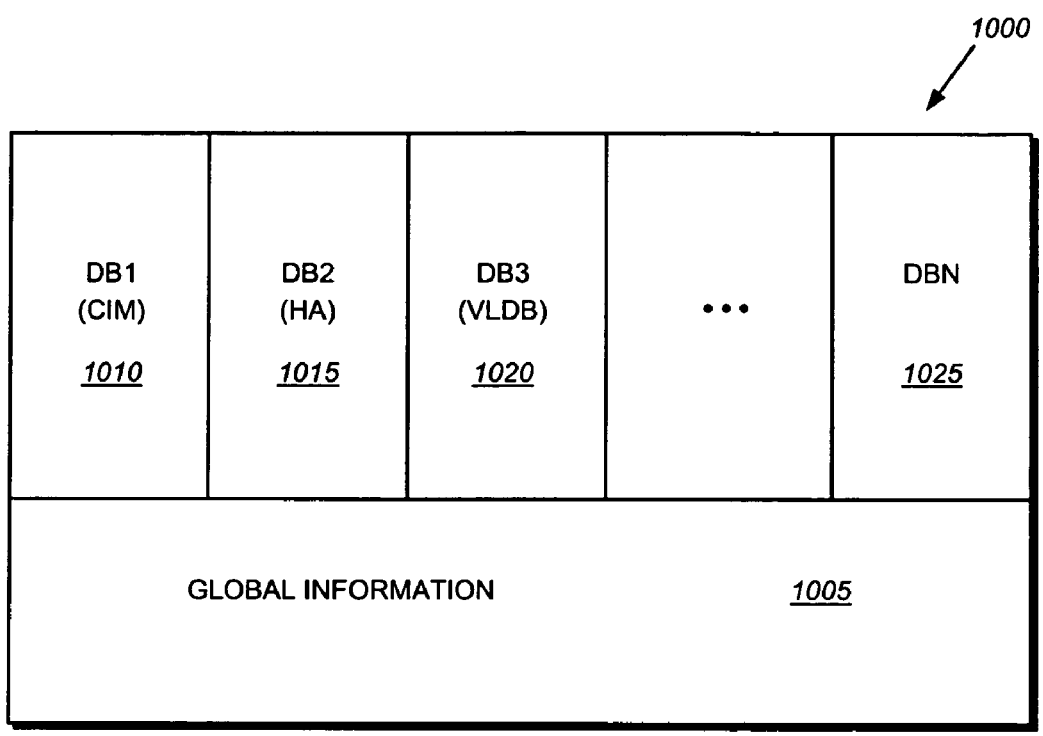
FIG. 10 is a schematic block diagram of an exemplary replicated database high availability storage pool data structure in accordance with an embodiment of the present invention.

FIG. 10 is a schematic block diagram of a RDB High Availability Storage Pool (RDBHASP) data structure 1000 as used in accordance with an embodiment of the present invention. The RDBHASP is illustratively embodied as a table that is stored in a RDB portion of a storage pool owned by a D-blade and that includes a number of entries or slots 1010, 1015, 1020 and 1025 along with a global information section 1005. Each of the slots 1010, 1015, 1020, 1025 stores information for an assigned management process application ("service"), such as the CIM Management Framework 810, the HA Mgr 820 or the VLDB 830, in accordance with a cluster configuration. The information stored in each slot includes status, state and various configuration settings associated with its assigned service. For example, the information stored in a slot may indicate a node designated as "HA-active" in the cluster for a particular service, i.e., the node that is designated as the sole RW replica when quorum cannot form under HA-configuration, and is thereby able to perform updates for the resident management processes. Note that the global information section stores data (e.g., metadata) not associated with any particular application.

E. HA_ACTIVE Mode

The present invention is directed to bi-directional failure among nodes of a two-node cluster utilizing quorum-based data replication. In the illustrative embodiment the two node cluster is in HA-configuration; neither node is configured with epsilon, so the normal quorum requirements are 2/2 (both nodes required). In response to a failure to one of the nodes, or a failure in communication between the nodes, the cluster exits the conventional (2/2) quorum state and enters a high availability "active" state wherein only is a single "HA-active" node is designated as a full read/write (RW) replica of the cluster, thereby dispensing with typical quorum requirements. As a full RW replica, the HA-active node can modify (update) configuration information (i.e., management data) normally maintained by the quorum-based cluster replication service. Illustratively, the HA configuration may be established via the GUI of management framework 810. A storage pool of the D-blade is selected for use by RDB 850 and, in particular, to store the RDBHASP data structure 1000. Communication is then effected between the RDB and D-blade, as described further herein.

In the event of a communication failure between the nodes of the 2-node HA-configuration cluster, at most one node will be designated primary. To that end, an alternative communications technique is provided to select a primary node from among the nodes. In the illustrative embodiment, the alternate communication technique comprises a voting mechanism involving storage pools owned by the D-blade of each node. Only one D-blade can be the primary active owner of a storage pool at a time, wherein ownership denotes the ability to write data to the storage pool. The alternate communication technique extends the storage pool voting mechanism to include the RDBHASP data structure 100 resident in the D-blade's storage pool. As noted, the RDBHASP 1000 is adapted to store information (status, state and configuration settings) associated with the replicated service. An example of information stored in the RDBHASP structure is the indication whether the D-blade's node is a primary node.

Specifically, the RDB 850 in each node queries its D-blade to determine if it is the primary owner of the storage pool. If so, the node will have a chance to be designated as the HA-active node for the data replication service, subject to availability of the HA-active lock. If the other node is not recorded as having the HA-active lock in RDBHASP, then the primary node will record that lock in RDBHASP for itself, thereby acquiring the right to go HA-active. The successful node then persistently stores a HA_PREACTIVE state in its local unit 230 that indicates the locked ability to go HA-active (i.e., the activity lock). This is done by storing its node (site) ID in the entry to indicate the lock. Once it has transitioned to the HA_PREACTIVE state, the surviving node disables the quorum voting mechanism and waits an appropriate amount of time (e.g., one voting cycle) to ensure that voting has ceased.

The surviving node then assigns a temporary epsilon value to itself, which causes the node to now be in quorum (1+e)/2. Once the temporary epsilon value has been set, a trivial recovery is performed, and the node transitions to a HA_ACTIVE state and then comes online as the full RW replica for the replicated service.

Once the failure condition has passed, the HA-active master recognizes the presence of the other node, it drops temporary epsilon, and reestablishes normal voting. It then brings the node into synchronization via the normal distributed recovery protocol, clears the locally cached activity lock, and clears the activity lock in RDBHASP. The cluster is then fully operational with both nodes and may again fail in either direction. Storage of the HA_PREACTIVE and HA_ACTIVE states in the local unit along with setting the appropriate HA-activity lock in the RDBHASP data structure prevents the transition from one failed state, e.g., node 1 active and node 2 failed, directly to another failed state, e.g., node 1 failed and node 2 active. This ensures that before passing into the other failed state, the cluster will pass through a state where both nodes are active and have been synchronized during distributed recovery. This prevents data inconsistency and/or loss of data arising from divergent update paths.

Figure 11:
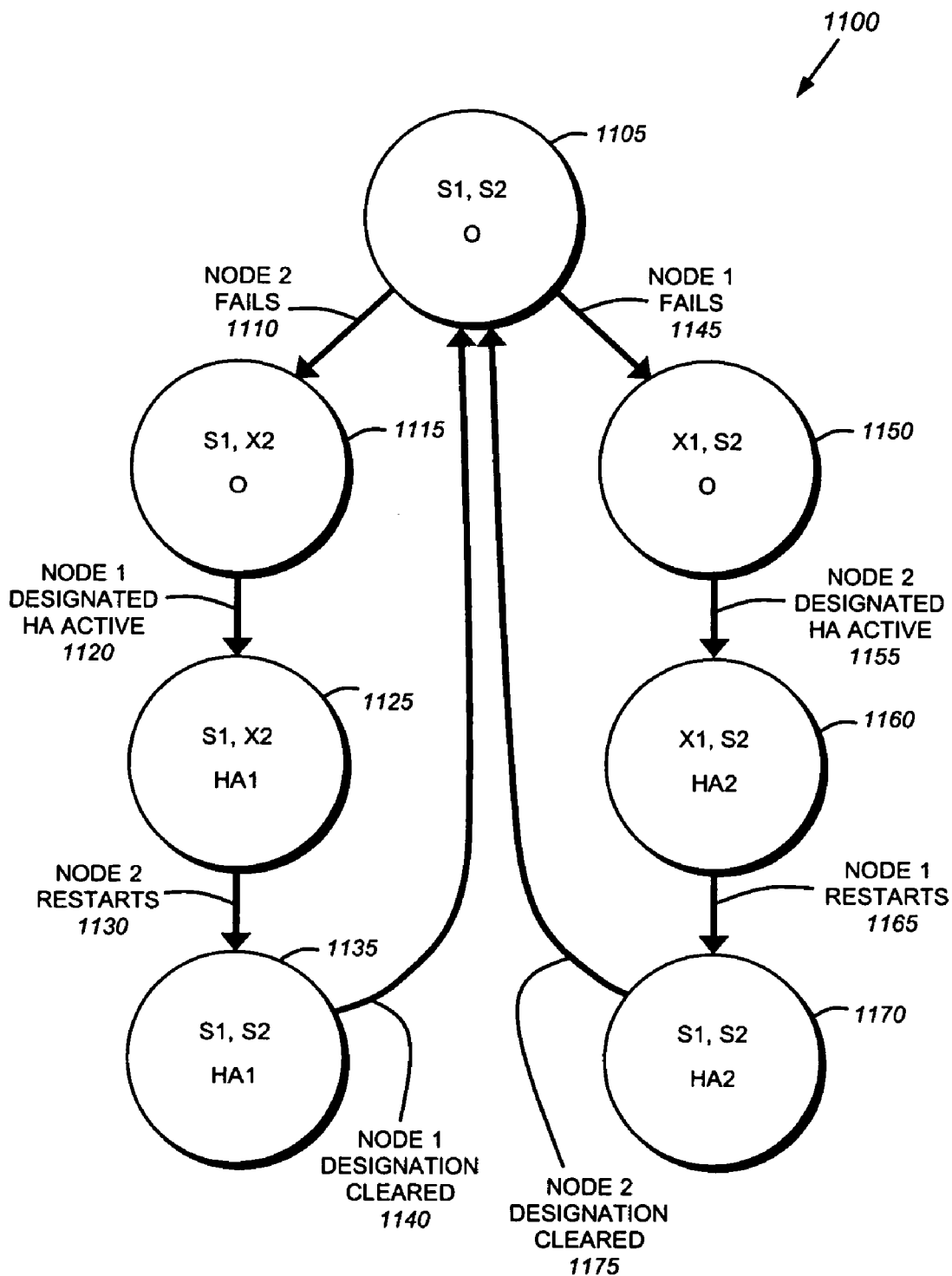
FIG. 11 is a state diagram showing the various states of a two node cluster may enter in accordance with an embodiment of the present invention.

FIG. 11 is a state diagram 1100 illustrates various states of the nodes of a two node cluster in accordance with an embodiment of the present invention. Here, the term S1 denotes that node 1 is active, whereas X1 denotes that node 1 has failed. Similarly, S2 and X2 signify that node 2 is active or failed respectively. The term HA1 designates that node 1 holds the right to enter the HA_ACTIVE state (elsewhere, referred to the HA-activity lock). Similarly, HA2 denotes node 2 holding that right. The initial state 1105 has both node 1 and node 2 of the two node cluster active and functioning (S1,S2). State 1105 is the normal state of the cluster and all operations may be performed to the cluster.

If node 2 fails (action 1110), the cluster moves to state 1115 (S1,X2). Note that the absence of an activity lock for either node 1 or 2 implies that neither node has cached that lock locally; accordingly, the full failover algorithm involving RDBHASP will commence. In response, node 1 is designated as HA_ACTIVE in action 1120, described in more detail below, which results in state 1125 (S1,X2)/HA1. It should be noted that state 1125 shows that node 1 holds the HA-activity lock HA_ACTIVE (HA1). Furthermore, it should be noted that there will be a period of time during action 1120 where the cluster is not able to accept write operations as it is temporarily out of quorum, and also in 1125 while the RDB is establishing the full HA_ACTIVE state. The cluster remains in state 1125 until node 2 restarts (action 1130) at which time the cluster transitions to state 1135 (S1,S2 and HA1); however, the cluster is still in HA_ACTIVE mode, with only node 1 processing write operations. Once node 2 has restarted and the error condition is cleared, the cluster transitions through action 1140, where the node 1 HA_ACTIVE designation is cleared to the initial state 1105. This transition, described further below, ensures that the restarted node 2 is brought in sync with node 1 so that when the cluster enters state 1105 both nodes contain identical management information. This ensures that if a failure happens immediately after entering state 1105, no data will be lost as both nodes are synchronized with each other, with bidirectional failover enabled once again.

Similarly, if node 1 fails (action 1145) while the cluster is in the initial state 1105, the cluster moves to state 1150 (X1, S2). In this state the cluster is out of quorum and write operations will not be processed. The cluster then designates node 2 as HA_ACTIVE (HA2) during event 1155 to state 1160 (X1,S2)/HA2. Once the cluster enters state 1160, node 2 may process write operations as it is in quorum with itself and in the HA_ACTIVE state. At some later point in time, node 1 restarts (event 1165) and the cluster moves to state 1170 (S1,S2)/HA2. At this point, the two nodes perform a resynchronization routine and the cluster transitions to state 1105 as the node 2 HA_ACTIVE designation is cleared (event 1175).

It should be noted that it is not possible to transition from state 1135 to state 1170 (or vice versa) without first moving through state 1105. This ensures that any data written to a node while it is in HA_ACTIVE mode will be distributed to the other node before the other node may enter into the HA_ACTIVE state. Also, note that although the diagrammed example speaks in terms of a node failing and restarting, that scenario is no different than two healthy nodes that simply cannot communicate. These cases are indistinguishable in general, and the same algorithm applies to each.

Figure 12:
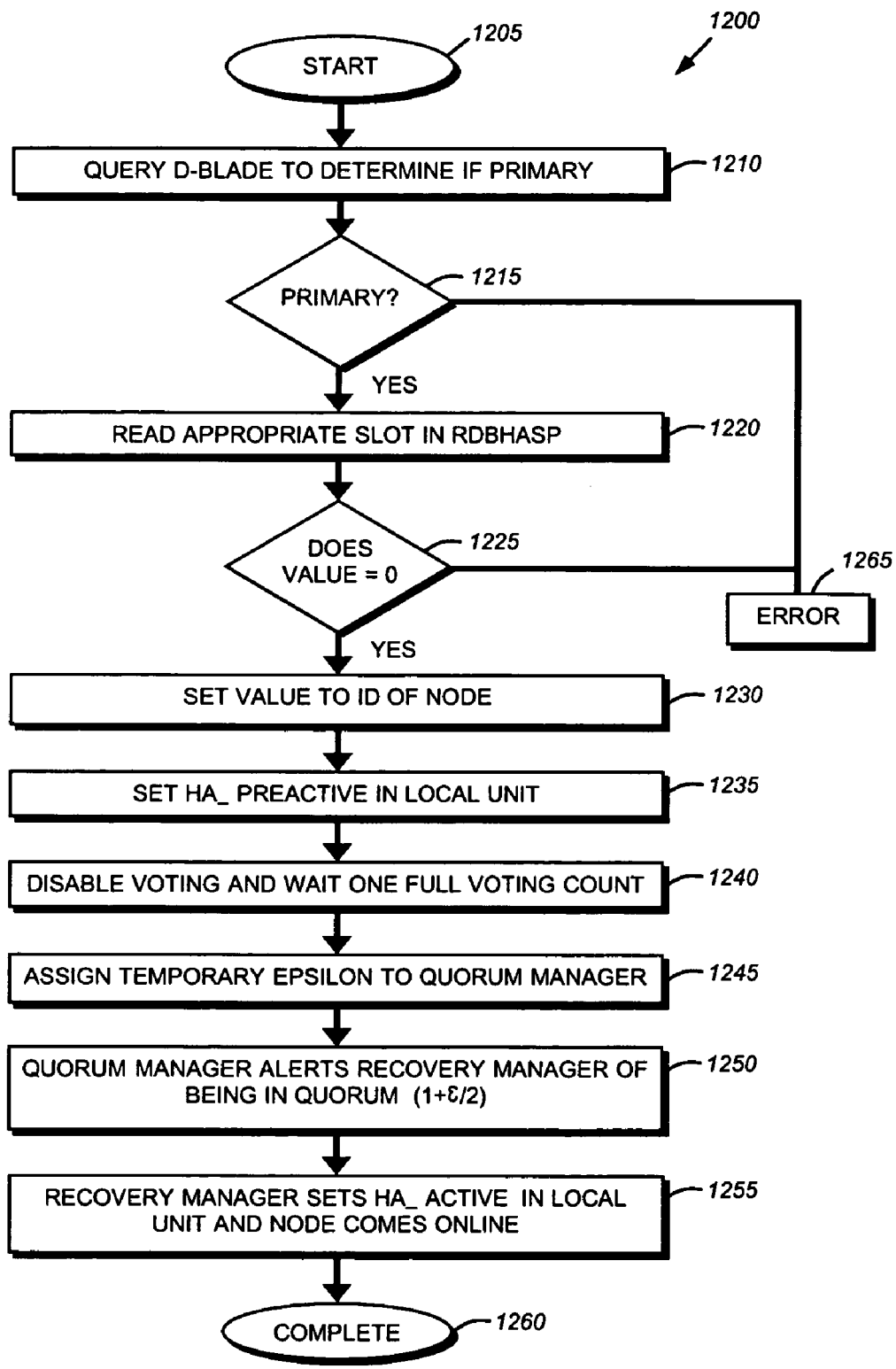
FIG. 12 is a flowchart detailing the steps of a procedure for entering a HA_ACTIVE mode in accordance with an embodiment of the present invention.

FIG. 12 is a flowchart detailing the steps of an activation procedure 1200 performed by the surviving node for entering the HA_ACTIVE state in accordance with an embodiment of the invention. In the illustrative embodiment, the procedure 1200 may be activated on behalf of any of the management data replication services in response to a failure has occurred to the other node. Such a failure may be due to a communications failure or an error condition on the other node. Illustratively, the procedure 1200 is performed on a system in HA-configuration (2/2 quorum requirements, no configuration epsilon), and the initial state is a healthy 2/2 quorum in a state of bidirectional failover.

The procedure 1200 begins in step 1205 and continues to step 1210 where the RDB queries the D-blade to determine if the node is the primary node for the cluster. This query may be accomplished using conventional RPC techniques to the D-blade. The primary node is designated as the recipient of the HA-activity lock; the primary node is determined by utilizing the storage pool voting mechanism described above for ensuring that only a node that is associated with an owning D-blade can access the various data structures therein. Thus, the D-blade's voting protocol is utilized as an alternate communication technique for selecting the primary node from among the nodes, and also for storage of the locks acquired based on that fact. In step 1215, a determination is made as to whether the node is the primary for the cluster. If the node is not the primary for the cluster, the procedure branches to step 1265 and performs appropriate error processing, including halting write operation processing on that node until it can be brought back into quorum. This may occur when, for example, the two nodes lose communication with each other, but are otherwise healthy. In such a situation, both nodes will query their D-blade to determine if they are the primary for the cluster. Only one will receive a positive response, i.e., the node that is the primary.

If the node is the primary, the procedure continues to step 1220 where the slot in the RDBHASP 1000 associated with the service is examined (read). Within each entry in the RDB-HASP data structure is a value that identifies which, if any, node has the HA-activity lock. In step 1225, a determination is made as to whether the value is 0, which signifies that no node has a lock. If the value is not 0, then some other node has the HA-activity lock for the service, and the procedure branches to step 1265 for error processing. However, if the value is 0, then procedure continues to step 1230 where the lock value is set to the ID of the node, thereby asserting an activity lock on the service in favor of the node. A cached state of HA_PREACTIVE is then persistently stored (step 1235), which permits the node to continue with the failover operation despite other subsequent failures. For example, if the surviving node suffers an error condition and reboots, the persistently stored HA_PREACTIVE state permits the node to continue with procedure 1200 and enter the HA_ACTIVE mode to ensure continued ability to process write operations to the cluster. Another example: if the D-blade were to fail, the RDB would not need to query for the lock.

Next, in step 1240, the RDB disables voting and waits at least one full voting cycle. By disabling voting, the node ensures that both parties learn that the quorum has broken down, thereby stopping the flow of transactional propagation. If a vote request is received within this period, the RDB will vote "NO". If the period lapses and votes continue to arrive, the RDB will abort the activation procedure, and enter the normalization procedure. That involves synchronizing data (distributed recovery), and undoing the side effects of activation (including clearing the D-blade activity lock), and ultimately moving back to a normal 2/2 quorum.

In step 1245, the RDB assigns a temporary epsilon to its quorum manager 860 which, in step 1250, causes the quorum manager to declare itself as master of a new epoch, and to alert the recovery manager that the node is now in quorum as it has 1+e out of 2 quorum votes. In response, the recovery manager sets a HA_ACTIVE state in the local unit and the node becomes active for write operations (step 1255). The procedure then completes in step 1260.

Figure 13:
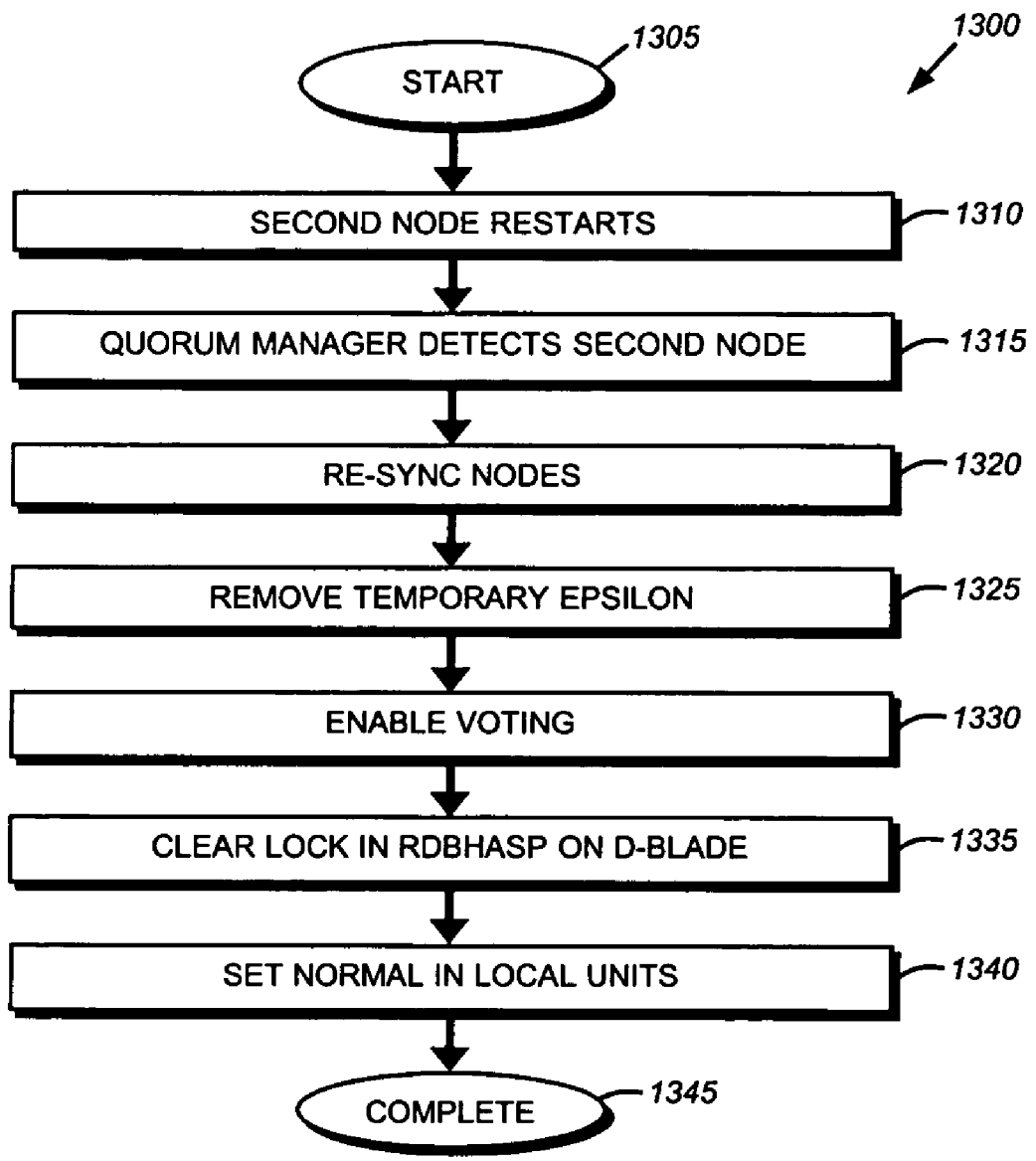
FIG. 13 is a flowchart detailing the steps of a procedure for exiting a HA_ACTIVE mode in accordance with an embodiment of the present invention.

FIG. 13 is a flowchart illustrating the steps of a normalization procedure 1300 for exiting the HA_ACTIVE mode and entering the NORMAL mode in accordance with an embodiment of the present invention. In the illustrative embodiment, the NORMAL state defines a state where there is a lack of any particular lock in the RDBHASP. Thus, NORMAL is illustratively the lack of any other locks. This procedure 1300 is followed when the failed node has been repaired and is ready to rejoin the quorum, or when communications have been reestablished. The procedure 1300 begins in step 1305 and continues to step 1310 where the second (or failed) node is restarted. This restart may be the result of a reboot of the failed node or may be caused by the repair and/or replacement of the node. The quorum manager 860 detects the presence of the second node in step 1315. Such detection may be due to the second node sending heartbeat signals over the cluster fabric. Once the presence of the second node has been detected, the recovery manager, in conjunction with the transaction manager, performs a resynchronization process to bring the second node up to date with the surviving node (step 1320). This resynchronization routine may be performed using conventional RDB RPCs between the two nodes.

The temporary epsilon assigned to the surviving node is removed in step 1325 and the quorum manager enables voting in step 1330. The primary lock that was established in the RDBHASP on the D-blade is then cleared (step 1335) using conventional RPC routines. At this point the second node is fully operational and the cluster is now in quorum (2/2). Finally, a NORMAL state is set in the local unit to signify that the surviving node is no longer in HA_ACTIVE mode (step 1340). The procedure then completes in step 1345.

To again summarize, the present invention provides a system and method for providing bi-directional failover for the data replication services of a two node cluster, while admitting no possibility of diverging update paths or other sources of data inconsistency. As opposed to conventional epsilon assigned quorum systems, where epsilon is part of the agreed configuration, the present invention dynamically assigns a temporary epsilon after a node has failed, thereby permitting failover in either direction of a two node system. Once it determines that its "partner" (or communications) has failed, at most one surviving node sets itself as the active node of the cluster in a RDBHASP data structure on the D-blade and then sets a HA_PREACTIVE state in its local unit's persistent store. Quorum voting is then disabled and then the surviving node assigns itself a temporary epsilon value, which brings it into quorum (1+e)/2. A HA_ACTIVE state is then set in the local unit and the node begins processing write operations as a node in a singleton quorum. The subsequent post-failure return to the normal 2/2 quorum state is automatic and safe.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for providing bi-directional failover for data replication services in a two node cluster, comprising:
   detecting a failure of one of the nodes; and
   in response to detecting the failure, exiting a conventional quorum state and entering a high availability state, wherein in the high availability state a single node is designated as a stand alone node that is a full read/write replica for the data replication services of the cluster, thereby enabling management services reliant on updates for replicated data to function normally, and wherein the conventional quorum state requires a majority of the nodes to be healthy to have quorum and neither node is initially configured with an epsilon value.

2. The method of claim 1 wherein the failure in one of the nodes comprises a failure in communication between the nodes.

3. The method of claim 1 wherein the replicated data/services comprise a VFS location database.

4. The method of claim 1 wherein the replicated data/services comprises a management framework.

5. The method of claim 1 wherein the replicated data/services comprises a high availability manager.

6. The method of claim 1, wherein each node is healthy when the node is active and responding to one or more client requests.

7. The method of claim 1, wherein the epsilon value gives greater weight in voting to the node assigned the epsilon value.

8. A method for providing a bi-directional failover in a cluster comprising a first node and a second node, comprising:
   providing the first node and the second node configured in a conventional quorum state, wherein the conventional quorum state requires a majority of the nodes to be healthy to have quorum and neither node is initially configured with an epsilon value;
   detecting, by the first node, an error condition on the second node;
   setting, by the first node, a local cached activity lock identifying the first node as active in the cluster;
   setting a first persistent state in a local unit of the first node;
   assigning a temporary epsilon value to the first node, wherein the first node enters into quorum as a result of the temporary epsilon value; and
   setting a second persistent state in the local unit of the first node, wherein the second persistent states is a high availability state where the first node is designated as a stand alone node that is a full read/write replica of the cluster.

9. The method of claim 8 wherein the step of detecting the error condition further comprises: detecting a lack of a heartbeat signal from the second node.

10. The method of claim 8 wherein the first persistent state comprises a HA_PREACTIVE state.

11. The method of claim 8 wherein the local unit comprises a storage device.

12. The method of claim 8 further comprising:
   detecting, by the first node, the post-failure presence of the second node;
   performing a resynchronization routine between the first and second nodes;
   removing the temporary epsilon value from the first node;
   clearing the local cached activity lock from the local unit of the first node;
   clearing an activity lock from a D-blade; and
   wherein the first and second nodes are in quorum and capable of processing write operations.

13. The method of claim 12 wherein the step of performing a resynchronization routine between the first and second nodes exchanges deltas in order to ensure that both database replicas (RDB) on the first and second node are identical.

14. A computer readable medium for providing a bi-directional failover in a cluster comprising a first node and a second node, the computer readable medium including program instructions for performing the steps of:
   providing the first node and the second node configured in a conventional quorum state, wherein the conventional quorum state requires a majority of the nodes to be healthy to have quorum and neither node is initially configured with an epsilon value;
   detecting, by the first node, an error condition on the second node;
   setting, by the first node, a local cached activity lock identifying the first node as a primary of the cluster;
   setting a first persistent state in a local unit of the first node;
   assigning a temporary epsilon value to the first node, wherein the first node enters into quorum as a result of the temporary epsilon value; and
   setting a second persistent state in the local unit of the first node, wherein the second persistent states is a high availability state where the first node is designated as a stand alone node that is a full read/write replica of the cluster.

15. The computer readable medium of claim 14 wherein the computer readable medium further includes program instructions for performing the steps of:
   detecting, by the first node, the post-failure presence of the second node;
   performing a resynchronization routine between the first and second nodes;
   removing the temporary epsilon value from the first node;
   clearing the local cached activity lock from the local unit of the first node;
   clearing an activity lock from a D-blade; and
   wherein the first and second nodes are in quorum and capable of processing write operations.

16. A system for providing a bi-directional failover in a cluster comprising a first node and a second node, the system comprising:
   a storage operating system executed by a processor on the first node and the storage operating system having a replicated database (RDB), the RDB comprising a quorum manager configured to assign a temporary epsilon value to the first node in response to detecting an error condition in the second node, the temporary epsilon causing the first node to be in quorum and to allow the second node to come online to form the cluster between the first node and the second node, wherein the RDB further comprises a recovery manager configured to set a lock in a data structure identifying the first node as the owner of an HA activity lock in the cluster and further configured to set a first persistent state value in a local unit of the first node.

17. The system of claim 16 wherein the recovery manager is further configured to set a second persistent state to indicate that the recovery manager is in a HA_ACTIVE state in the local unit of the first node in response to the quorum manager assigning the temporary epsilon to the first node and thereby establishing quorum.

18. A computer readable medium for providing bi-directional failover among nodes of a two node replicated data cluster, the computer readable medium including program instructions for performing the steps of:

detecting a failure of one of the nodes; and in response to detecting the failure, exiting a conventional quorum state and entering a high availability state, wherein in the high availability state a single node is designated as a full read/write replica within the cluster data replication service, the full read/write replica modifying configuration information relating to one or more replicated services provided by the replicated services cluster, and wherein the conventional quorum state requires a majority of the nodes to be healthy to have quorum and neither node is initially configured with an epsilon value.

19. A system to provide bi-directional failover for data replication services in a two node cluster, comprising:

in response to detecting a failure, a disk element module executed by a processor, the disk element module configured, to designate a first node of the two nodes as a stand alone node that is a full read/write replica for the data replication services of the cluster, thereby enabling management services reliant on updates for replicated data to function normally; and a quorum manager configured to assign a temporary epsilon value to the first node in response to detecting an error condition in a second node, the temporary epsilon causing the first node to be in quorum and to allow the second node to come online to form the cluster between the first node and the second node.

20. The system of claim 19 wherein the failure in one of the nodes comprises a failure in communication between the nodes.

21. The system of claim 19 wherein the replicated data/services comprise a VFS location database.

22. The system of claim 19 wherein the replicated data/services comprises a management framework.

23. The system of claim 19 wherein the replicated data/services comprises a high availability manager.

24. The system of claim 19, further comprising:

an operating system to exit a conventional quorum state and enter a high availability state.

25. A method for providing bi-directional failover for data replication services in a two node cluster, comprising:

detecting a failure of one of the nodes; and in response to detecting the failure, exiting a conventional quorum state and entering a high availability state, wherein a single node is designated as a full read/write replica for the data replication services of the cluster by storing in a lock associated with the single node in a disk element, thereby enabling management services reliant on updates for replicated data to function normally, and wherein the conventional quorum state requires a majority of the nodes to be healthy to have quorum and neither node is initially configured with an epsilon value.

26. A method for providing a bi-directional failover in a cluster comprising a first node and a second node, comprising:

providing the first node and the second node configured in a conventional quorum state, wherein the conventional quorum state requires a majority of the nodes to be healthy to have quorum and neither node is initially configured with an epsilon value;

detecting, by the first node, an error condition on the second node;

setting, by the first node, a local cached activity lock identifying the first node as active in the cluster;

setting a first persistent state in a local unit of the first node;

assigning a temporary epsilon value to the first node, wherein the first node enters into quorum as a result of the temporary epsilon value;

setting a second persistent state in the local unit of the first node, wherein the second persistent states is a high availability state where the first node is designated as a stand alone node that is a full read/write replica of the cluster;

detecting, by the first node, the post-failure presence of the second node;

performing a resynchronization routine between the first and second nodes; and removing the temporary epsilon value from the first node.

27. The method of claim 26 wherein the step of detecting the error condition further comprises: detecting a lack of a heartbeat signal from the second node.

28. The method of claim 26 wherein the first persistent state comprises a HA_PREACTIVE state.

29. The method of claim 26 wherein the local unit comprises a storage device.

30. The method of claim 26 further comprising:

clearing the local cached activity lock from the local unit of the first node;

clearing an activity lock from a D-blade; and wherein the first and second nodes are in quorum and capable of processing write operations.

31. The method of claim 26 wherein the step of performing a resynchronization routine between the first and second nodes exchanges deltas in order to ensure that both database replicas (RDB) on the first and second node are identical.

* * * * *

UNITED STATES PATENT AND TRADEMARK OFFICE
CERTIFICATE OF CORRECTION

| | | |
|---|---|---|
| PATENT NO. | : 7,478,263 B1 | Page 1 of 1 |
| APPLICATION NO. | : 10/858418 | |
| DATED | : January 13, 2009 | |
| INVENTOR(S) | : Ronald W. Kownacki | |

It is certified that error appears in the above-identified patent and that said Letters Patent is hereby corrected as shown below:

In Col. 13, line 6 should read:
high availability "active" state wherein only ~~is~~ a single "HA- Signed and Sealed this
Twenty-ninth Day of May, 2012

David J. Kappos
*Director of the United States Patent and Trademark Office*